United States Patent
Adams

(10) Patent No.: US 8,833,393 B2
(45) Date of Patent: Sep. 16, 2014

(54) CAP VALVE

(76) Inventor: Charles J. Adams, Fairlawn, VA (US)

( * ) Notice: Subject to any disclaimer, the term of this patent is extended or adjusted under 35 U.S.C. 154(b) by 247 days.

(21) Appl. No.: 13/225,378

(22) Filed: Sep. 2, 2011

(65) Prior Publication Data

US 2012/0055573 A1 Mar. 8, 2012

Related U.S. Application Data

(60) Provisional application No. 61/402,690, filed on Sep. 3, 2010.

(51) Int. Cl.
| | |
|---|---|
| F16K 3/24 | (2006.01) |
| F16L 53/00 | (2006.01) |
| E21B 34/04 | (2006.01) |
| E21B 43/12 | (2006.01) |
| E21B 43/01 | (2006.01) |
| F16L 37/62 | (2006.01) |
| E21B 33/02 | (2006.01) |

(52) U.S. Cl.
CPC ............. *F16L 37/62* (2013.01); *E21B 43/0122* (2013.01); *E21B 33/02* (2013.01)
USPC ................ 137/625.37; 137/599.14; 166/93.1; 166/97.1; 166/363; 166/364

(58) Field of Classification Search
USPC ............. 251/210, 152, 148, 151; 137/625.37, 137/625.12, 625.13, 625.14, 599.02, 137/599.14; 166/75.13, 95.1, 93.1, 96.1, 166/97.1, 338, 351, 363, 364
See application file for complete search history.

(56) References Cited

U.S. PATENT DOCUMENTS

| | | | | |
|---|---|---|---|---|
| 1,949,672 | A | * | 3/1934 | Barrier .............................. 166/55 |
| 2,522,444 | A | * | 9/1950 | Grable .......................... 166/81.1 |
| 2,687,177 | A | * | 8/1954 | De Camp ..................... 166/76.1 |
| 2,946,386 | A | * | 7/1960 | Jones .......................... 166/75.13 |
| 3,325,190 | A | * | 6/1967 | Eckert et al. ...................... 285/18 |
| 3,777,502 | A | * | 12/1973 | Michie et al. ................... 62/50.7 |
| 4,051,676 | A | * | 10/1977 | Ledeen et al. ................... 60/404 |
| 4,113,012 | A | | 9/1978 | Evans et al. |
| 4,144,937 | A | | 3/1979 | Jackson et al. |
| 4,296,910 | A | | 10/1981 | Gratzmuller |
| 4,323,118 | A | * | 4/1982 | Bergmann .................... 166/96.1 |
| 4,337,831 | A | * | 7/1982 | Thaxton .......................... 169/69 |
| 4,382,716 | A | * | 5/1983 | Miller .............................. 405/60 |
| 4,423,774 | A | * | 1/1984 | Mefford ...................... 166/77.51 |
| 4,461,354 | A | * | 7/1984 | Buras et al. .................... 166/343 |
| 4,568,220 | A | * | 2/1986 | Hickey .............................. 405/60 |
| 4,650,153 | A | | 3/1987 | Winegeart |
| 4,661,017 | A | | 4/1987 | Wood et al. |
| 4,682,913 | A | | 7/1987 | Shatto et al. |
| 4,729,433 | A | | 3/1988 | Jacob |

(Continued)

*Primary Examiner* — Stephen M Hepperle
*Assistant Examiner* — Seth W Mackay-Smith
(74) *Attorney, Agent, or Firm* — Johnston Holroyd; Mary-Jacq Holroyd

(57) ABSTRACT

A hydraulic connector (14) attaches a valve chamber (16) to a flow pipe (P) using a hydraulic clamp (20) to grab the pipe (P) or a flange (F). The valve chamber (16) contains a primary hydraulic ram (26) to telescopically extend a primary seal (28) on the ram (26) to close or open the outlet ports (22) by moving the primary seal (28) to permit flow through valve up flow tubes (34) to a riser (R). Outlet ports (22) in the cap valve (12), or an intermittent pipe (18), permit unrestricted flow while the connector (14) is being installed.

18 Claims, 9 Drawing Sheets

(56) References Cited

U.S. PATENT DOCUMENTS

| | | | |
|---|---|---|---|
| 4,776,399 A | 10/1988 | Jacob | |
| 5,048,611 A | 9/1991 | Cochran | |
| 5,121,793 A * | 6/1992 | Busch et al. | 166/79.1 |
| 5,152,346 A * | 10/1992 | Wilson | 169/52 |
| 5,213,444 A | 5/1993 | Henning | |
| 5,365,769 A | 11/1994 | Ferry | |
| 6,955,221 B2 * | 10/2005 | Bursaux | 166/303 |
| 7,090,254 B1 * | 8/2006 | Pietras et al. | 285/18 |
| 2008/0236810 A1 * | 10/2008 | Bornes et al. | 166/61 |

* cited by examiner

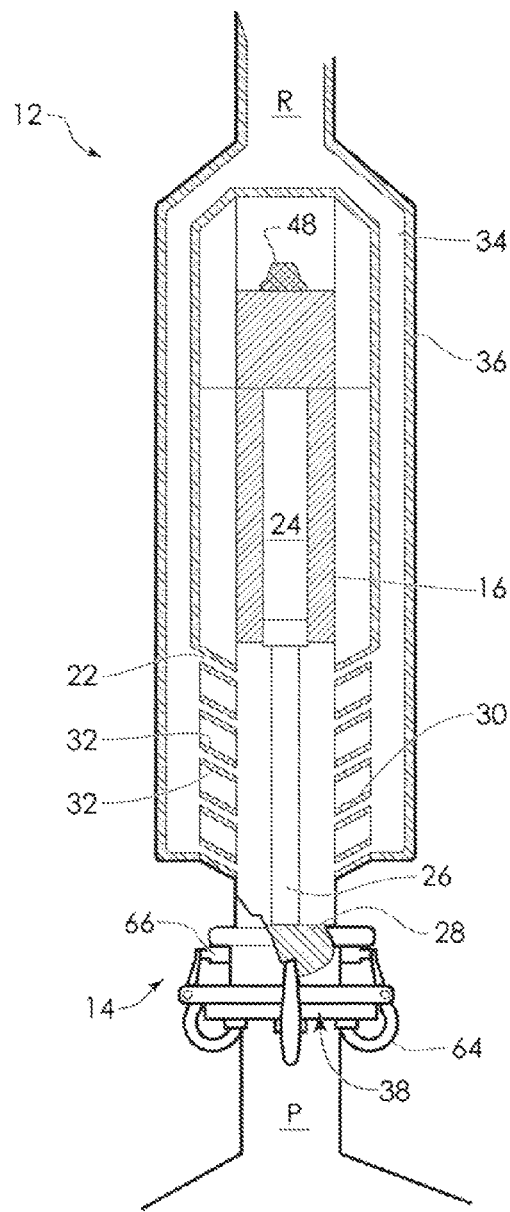
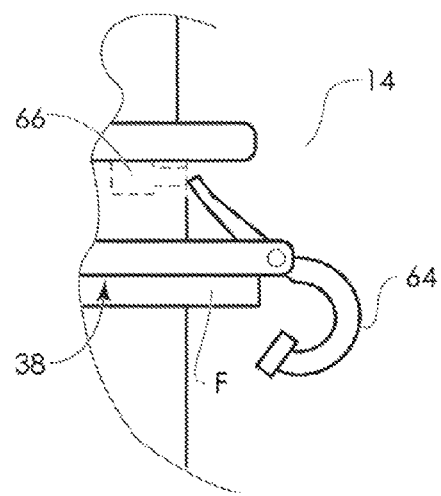
FIG. 3A
FIG. 3B

CAP VALVE

RELATED APPLICATIONS

This application claims the benefit of U.S. Provisional Application Ser. No. 61/402,690 entitled "Gypsy cap valve that controls the flow from errant undersea wells" filed on 3 Sep. 2010, the contents of which are incorporated herein by reference in its entirety.

BACKGROUND OF THE INVENTION

As oil and gas wells are drilled in more remote locations, such as in deep sea wells, the need for an ability to readily cap a blown well, pipe, or faulty blow out preventer (BOP) becomes more apparent. Known devices and methods of using them exist wherein valve actuation is by differential pressures of the well fluids, auto-responsive to pressure delivery, or manually triggered to operate the delivery of crude oils and gas upward to a riser going up to the surface of a body of water. In these well head valves through various methods of circulation of oil/gas becomes useful for production of the well. Unfortunately, the remote location makes it essential that mechanisms exist to cap such a well remotely.

U.S. Pat. No. 5,048,611 shows a pressure operated circulation valve for use in oil field operations, and is pressure operated without the use of a wireline tool; the valve has a sleeve assembly with telescopically joined sleeve members normally closing off a circulation port in a mandrel so that a pressure differential is used to shift the joined sleeve members to an unjoined condition opening the circulation ports, and a second pressure differential is used to rejoin the sleeve members and close off the circulation ports. The sleeve members are then independently shear pinned to the mandrel.

U.S. Pat. Nos. 4,776,399 and 4,729,433 show oil-well safety valves comprising a movable shutter, an inner tubular slide, a return-spring for the slide, hydraulic means for moving the slide downward by pressurization of a control fluid, a system for anchoring the valve in a receiving sleeve and packings at the contact of the receiving sleeve, the packings being located on either side of the control fluid intake; the anchoring system being located above the packings and the return spring being located below in a part of the sealed volume receiving the control fluid. The valve including an anchoring system comprising a hydraulically actuated mechanical system including a tubular shuttle piston subjected to the pressure of the control fluid to be moved upward by this fluid, and by a locking bushing located above the shuttle piston for forcing it upwardly, so that when the bushing moves, it actuates and locks anchoring dogs floating in the lock body.

A piston mechanism is disclosed in U.S. Pat. No. 4,113,012 including a circulation valve for use in the testing of an oil well in which the circulation valve may be reclosed by application of well annulus pressure to allow a subsequent treating or testing program. A spring means is subjected to well annulus pressure on two ends of a volume of fluid. The volume of fluid is divided by a divider which includes pressure relief mechanisms such that fluid on one side of the divider is either higher or lower than the well annulus pressure. This different pressure is applied to one set of a piston, and the other side of the piston is subject to well annulus pressure such that movement of the piston may be controlled by changing the well annulus pressure.

The addition of a ball closure device in part controlled by a testing string, and in part by pressure, is disclosed in the U.S. Pat. No. 4,144,937. A tester valve has a ball valve rotatable between the open and closed positions for use with a test string to test an oil well. The apparatus includes a ball closing piston in the valve operating mechanism to rotate the ball to the closed position. One side of the ball closing piston is exposed to a first pressure of formation fluid flowing through the interior of the test string on the upstream side of the ball valve. The other side of the piston is exposed to a second pressure which is lower than the first pressure by a pressure drop caused as the fluid flows through the apparatus past the ball being rotated to the closed position. A bypass mechanism is additionally disclosed which is operable for equalizing the pressure on both sides of the ball closing piston when the ball is being rotated to the open position.

U.S. Pat. No. 5,365,769 shows a method for verifying the correct operation of a safety valve of an oil well which uses a hydraulic mechanism to maintain open an oil well flow of crude oil and gas, and upon stopping the hydraulic pressure the safety valve will close to stop all oil or gas flow. This safety valve is used near the ground surface or surface of the sea of a maximum of thirty (30) meters as the hydraulic fluid is provided along the drill string that operates the valve.

U.S. Pat. No. 5,213,444 shows an anchored device to capture the upwelling crude oil or gas, and then apparatus to separate flammable gas from the useful oil that is piped away to ship or reservoir for production uses. An interesting device but inordinately heavy and cumbersome, and it has proven questionable in its efficiency and recovery utility in practice.

U.S. Pat. No. 4,296,910 describes a hydraulically controlled safety valve that is mounted on an underwater oil well, and is remote-controlled from a central control station. The control station is connected to a receiving station, where the valve is disposed, via a single small-section hydraulic line which feeds, at a low rate of flow, a hydro-pneumatic accumulator for supplying an operating jack of the valve. This device is typically already in place, mounted directly upon the stem pipe, now known as a BOP.

U.S. Pat. No. 4,650,153 describes a safety valve and operator for a rotatable Kelly or drill string, and as such this shows an operable ball valve to control a 'blowout' of an oil well. This valve is intended to be powered from a surface hydraulic pump, and is mountable on a spinning 'kelly' platform. U.S. Pat. Nos. 4,682,913 and 4,661,017 both describe an apparatus and method for connecting a fluid conduit carried by a remotely operated vehicle (ROV) to a fluid conduit of a subsea equipment assembly, such as a hydraulically actuated device, in a non-binding manner. U.S. Pat. No. 4,051,676 describes an actual hydraulic ram valve for the forceful power of the ram method, but is shown as a prior assembly being attached by bolts prior to placement and use.

None of these patents provide an effective and direct way to attach a ram style valve to a broken pipe, or even to a pipe with a flange, under strong pressure from a fluid flow, such as high pressure flow of oil, gas, water, or the like. As such, these existing inventions are unsuitable for controlling a runaway high pressure flow especially in a remote location, such as an undersea broken well pipe. It is very difficult to attach a pipe or other device to be in fluid communication with a high pressure flow without simply blowing the device away by the gushing fluid pressure.

SUMMARY OF THE INVENTION

The shutoff cap valve (12) of the present design serves in part to cap off the fluid flow of an errant well, and in part to become an operable valve to close or open the previously errant well. Although the design serves to close high pressure or uncontrolled fluid pressure from oil and gas wells, it may also be useful for water, steam or other uncontrolled fluid flow through pipes or wells.

An aspect of the present design is that it is used in part to cap off the fluid flow of an errant well, and is especially useful in deep sea situations wherein the errant well is spewing out tons of crude oil and gas from a broken pipe or failed BOP.

Another aspect of the present design is its use as the shutoff cap valve (12) for controlling or regulating broken oil well sea floor stem pipes, sea bed pipelines, and damaged, non-functional BOP where crude oil and gas leaks are evident or out of control. The present device can be used quickly in emergency situations, with as little loss of oil as possible. The device is a hydraulically activated tool that is put in place by a ROV which may use existing flanges (F) for attachment and operation, or may use a self-connecting method involving hydraulically attaching a clamshell collar (76) that is operable as needed for control of the errant well.

Yet another aspect of the present design is that the valve cap (12) can be used in many different situations both in warm water and cold, and in the deep off shore waters, even thousands of feet below the surface of the sea, where active drilling taking place currently in oil and gas wells.

The present design operates safely and effectively in deep water locations thousands of feet under the surface to control and operate a valve means upon errant oil wells with disabled or broken sea floor pipe stems. It can be seen that emergency situations have left the current technology lacking in the valve means to shut off an errant oil well crude oil and gas flow as described by the present designs.

Furthermore, the present design is suitable for deep sea use because the hydraulic mechanism is provided by a ROV, and the function of the valve of the present design is a double acting piston that moves in both directions to close or to open the crude oil or gas flow as needed by remote command means.

In the application of the present design, the leakage and containment is addressed immediately at the stem pipe (P) arising out of the sea floor in the several hydraulically controlled clamp attachment methods (64, 68, or 76) described herein.

The present design relates to an emergency valve (12) that can be placed upon a sea floor stem pipe (P) thousands of feet—even 5,000 or 10,000—below the surface of the sea.

The present design is useful as an emergency placement valve (12) upon existing deepwater oil pipe flanges (F), or upon broken off stem pipes (P) or the like. The design uses enough force and power to close off flows from such pipes (P), and to allow opening an errant flow or oil well for production if desired.

These and other aspects of the present invention will become readily apparent upon further review of the following drawings and specification.

BRIEF DESCRIPTION OF THE DRAWINGS

FIGS. 3A and 3B show another side view of the functions seen in FIGS. 1 and 2.

Similar reference characters denote corresponding features consistently throughout the attached drawings.

DETAILED DESCRIPTION OF PREFERRED EMBODIMENTS

Figure 1:
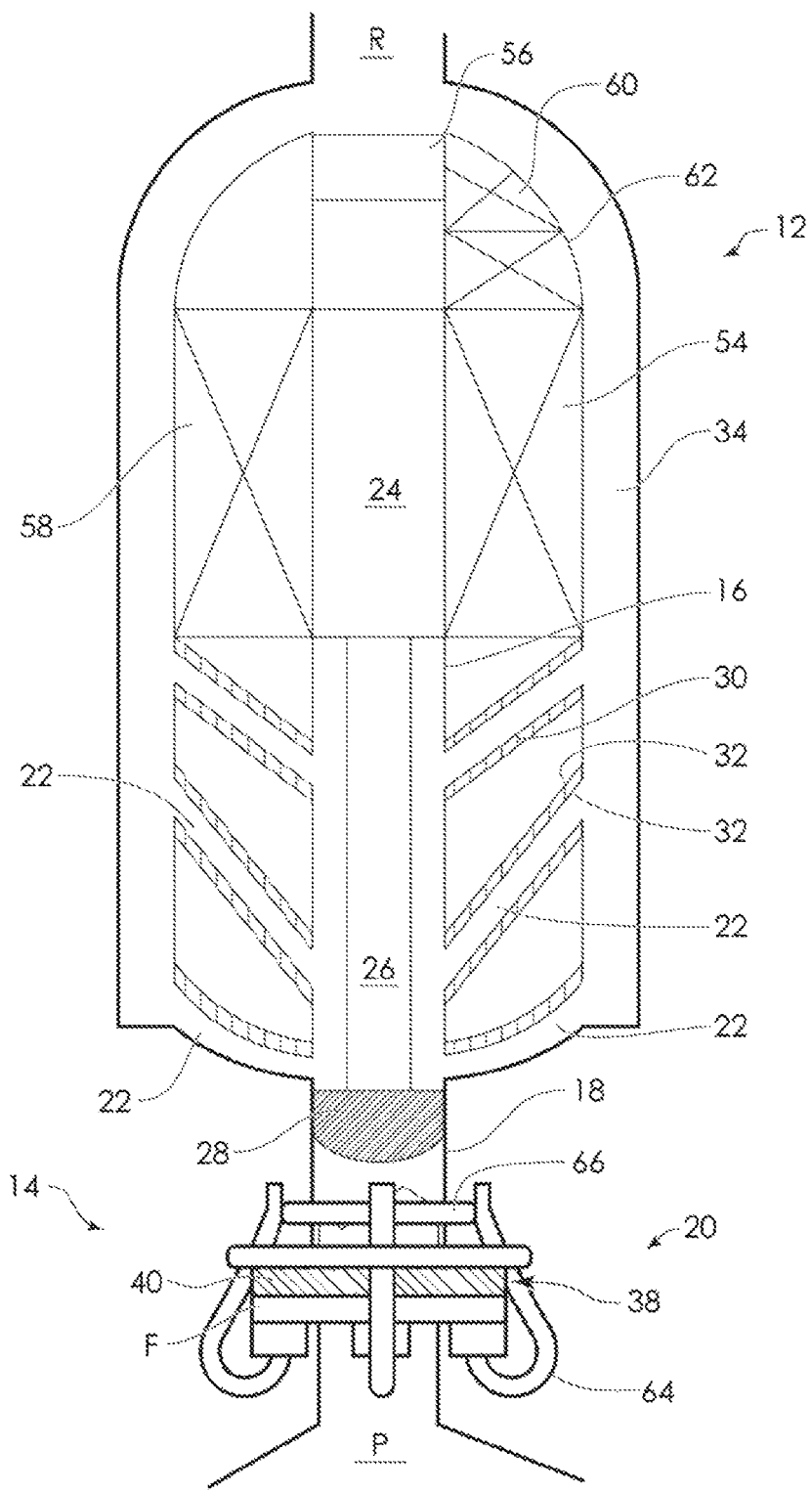
FIG. 1 shows a side view of the cap valve (12) according to an embodiment of the present design in a closed mode and attached to an existing oil stem pipe flange (F).

A cap valve (12) to shut off a runaway high pressure flow pipe (P) which is attached to the high pressure flow pipe (P) by a hydraulic controlled connector (14), shown in FIG. 1. The hydraulic controlled connector (14) is attached directly to a cylindrical valve chamber (16), or it is attached to an intermittent pipe (18) that is in turn connected to a cylindrical valve chamber (16). The connector (14), shown in FIG. 2A, attaches the cap valve (12) to the flow pipe (P) by a hydraulic clamp (20) that grabs the pipe (P) or grabs a flange (F) on the pipe (P). The connector (14) holds the cap valve (12) in position.

Outlet ports (22) are disposed in the cap valve (12), shown in FIG. 3A, or in the intermittent pipe (18), shown in FIG. 1, above the hydraulic clamp (20), shown in FIG. 3B, to permit high pressure flow to continue while the connector (14) is being installed on the pipe (P). The connector (14) is installed using HOV. The outlet ports (22), for use in deep sea or cold environments, may be insulated with heating elements (30), and the outlet ports (22) may also, or alternatively, double walled (32).

Figure 4:
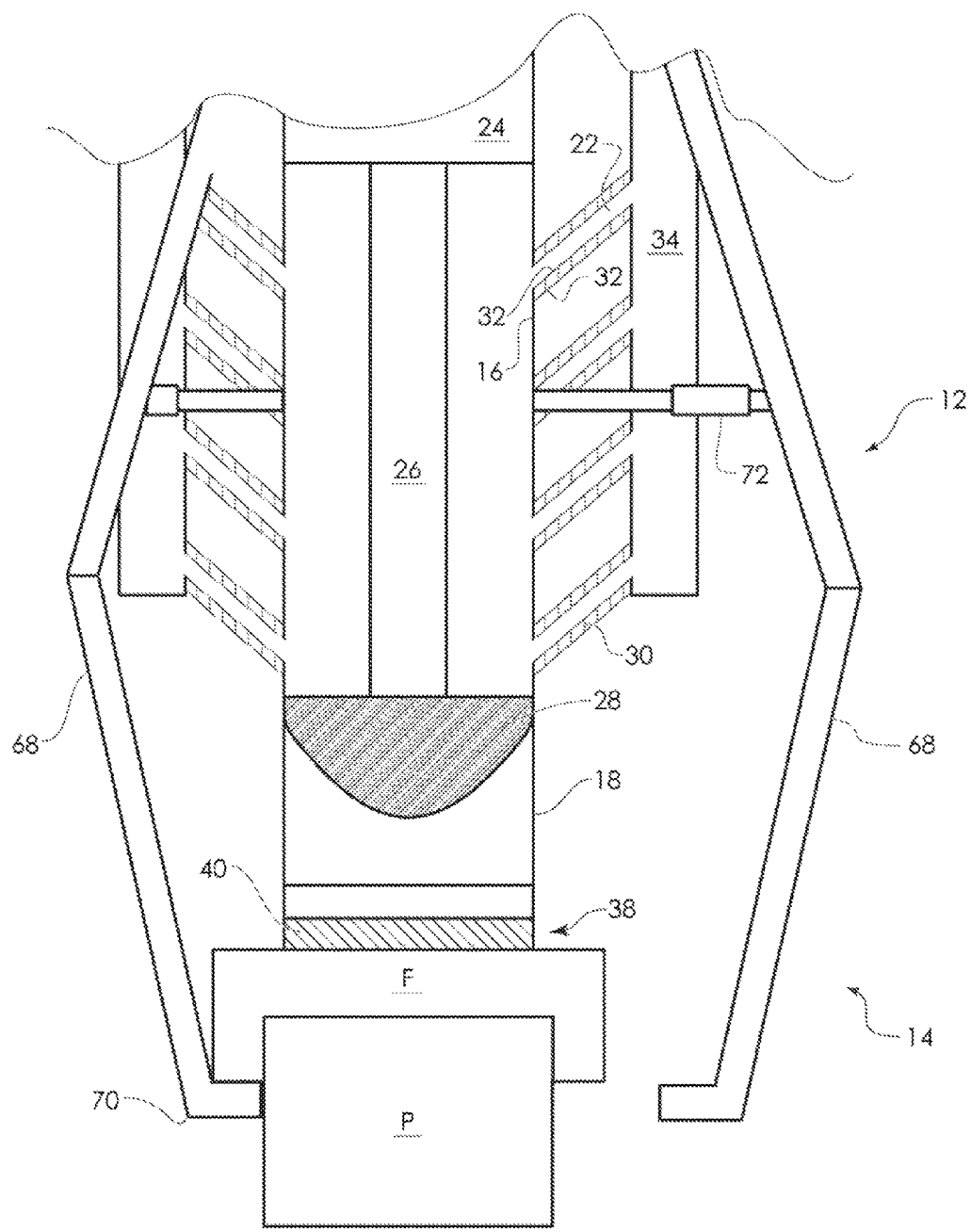
FIG. 4 shows an enlarged side view of the cap valve (12) according to an embodiment of the present design.

The cap valve (12) has a cylindrical valve chamber (16), also shown in FIG. 4, with a valve hydraulic cylinder (24) which encompasses a primary hydraulic ram (26). An adjustable flow primary seal (28), shown in FIG. 3A, and is disposed on the primary hydraulic ram (26), also shown in FIG. 5. The hydraulic ram (26) telescopically moves the primary hydraulic ram (26) to close or open access to the outlet ports (22) to open or block fluid communication through the outlet ports (22). The primary hydraulic ram (26) has a three way push-pull-hold functioning so that it can open and close, or be held intermittently between open and closed for an adjusted flow through openly accessed outlet ports (22).

The cap valve (12) may further have valve up flow tubes (34), as seen in FIGS. 1, 3A, 4, 5, and 9, in fluid communication with the outlet ports (22) to permit controlled flow about the cylindrical valve chamber (16) into an attached riser pipe (R). An option for use in cold environments is a double walled (36) valve for the up flow tubes (34) in fluid communication with the outlet ports (22) to permit controlled flow about the cylindrical valve chamber (16). Furthermore, the valve up flow tubes (34) may be insulated with heating elements (30).

Figure 2:
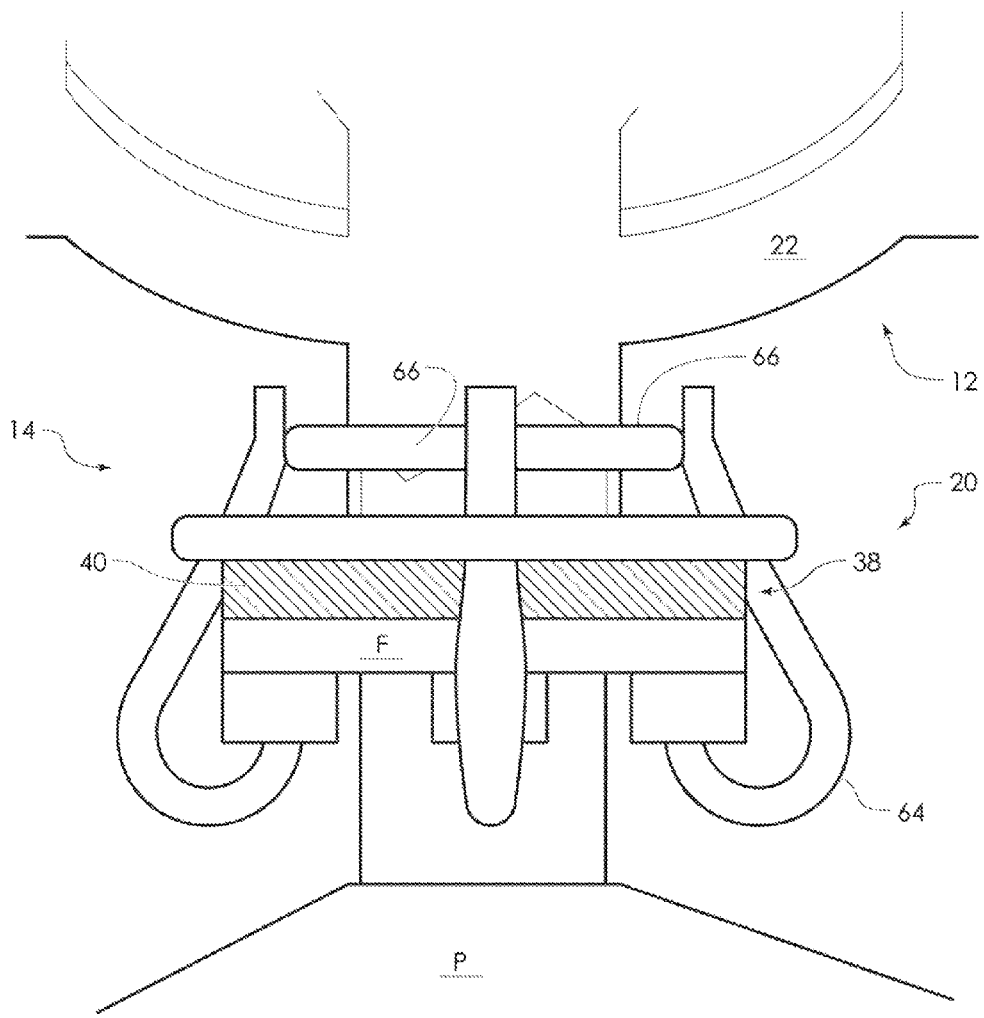
FIG. 2 shows an enlarged side view of FIG. 1 wherein the hydraulic ram (26) has forced its seal (28) to close off the flow from a well stem pipe (P).
Figure 5:
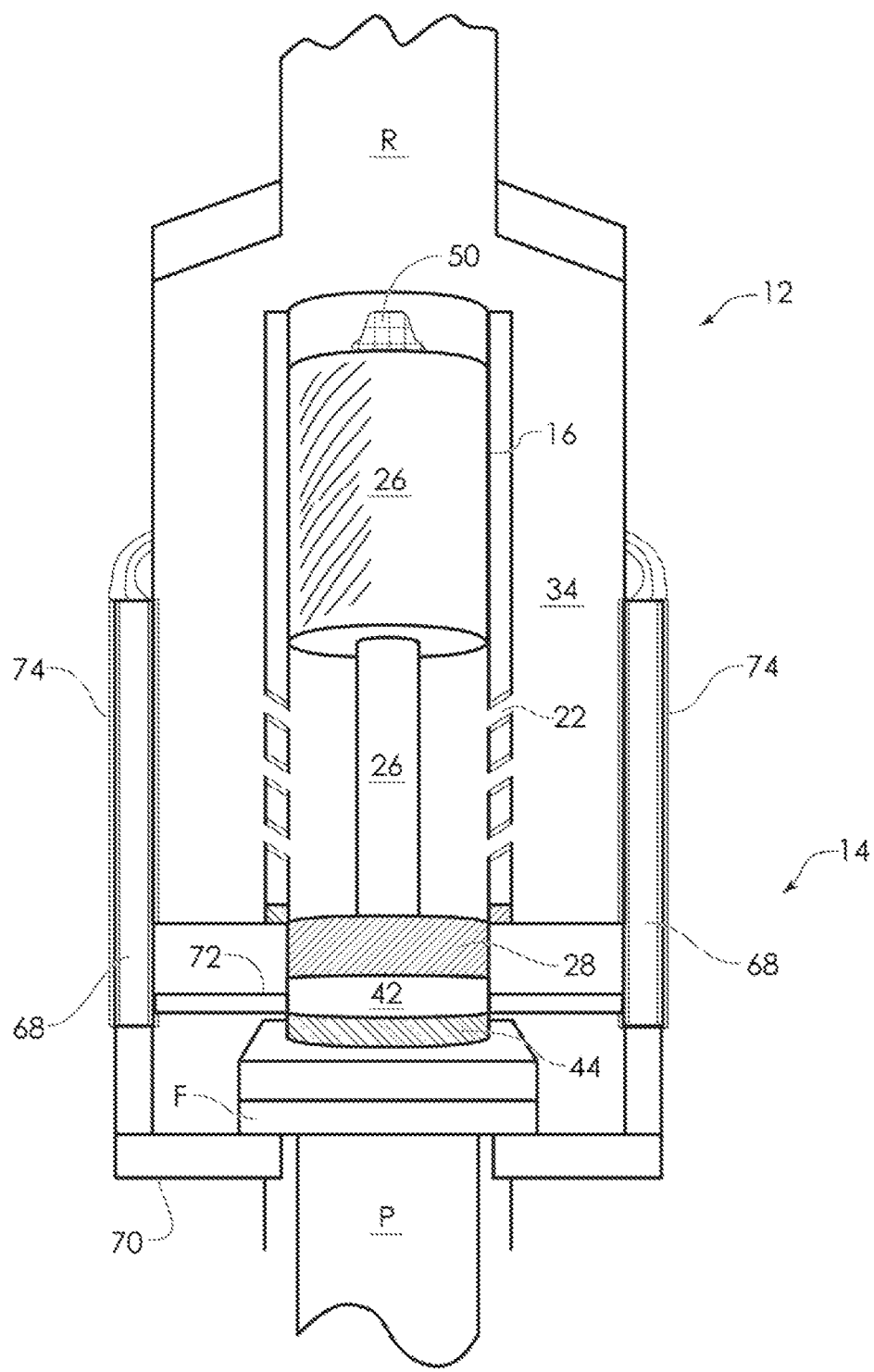
FIG. 5 shows another side view of a cap valve (12) according to an embodiment of the present design.
Figure 6:
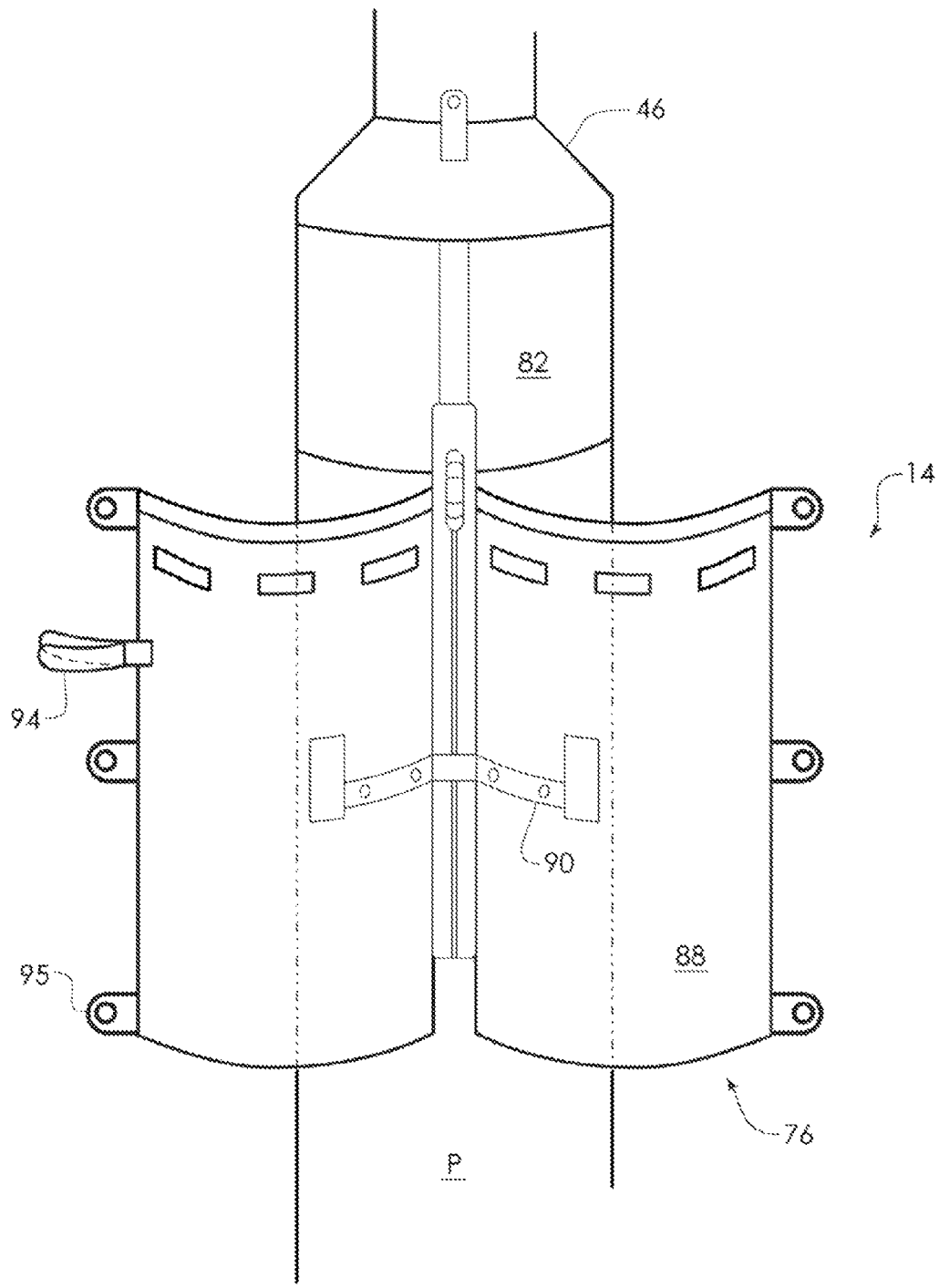
FIG. 6 shows a side view of the articulating flange, or clam shell collar (76), being open to be closed upon a stem pipe (P) to form a flange apparatus for the cap valve (12), or intermittent pipe (18), to seal off the oil/gas well.
Figure 7:
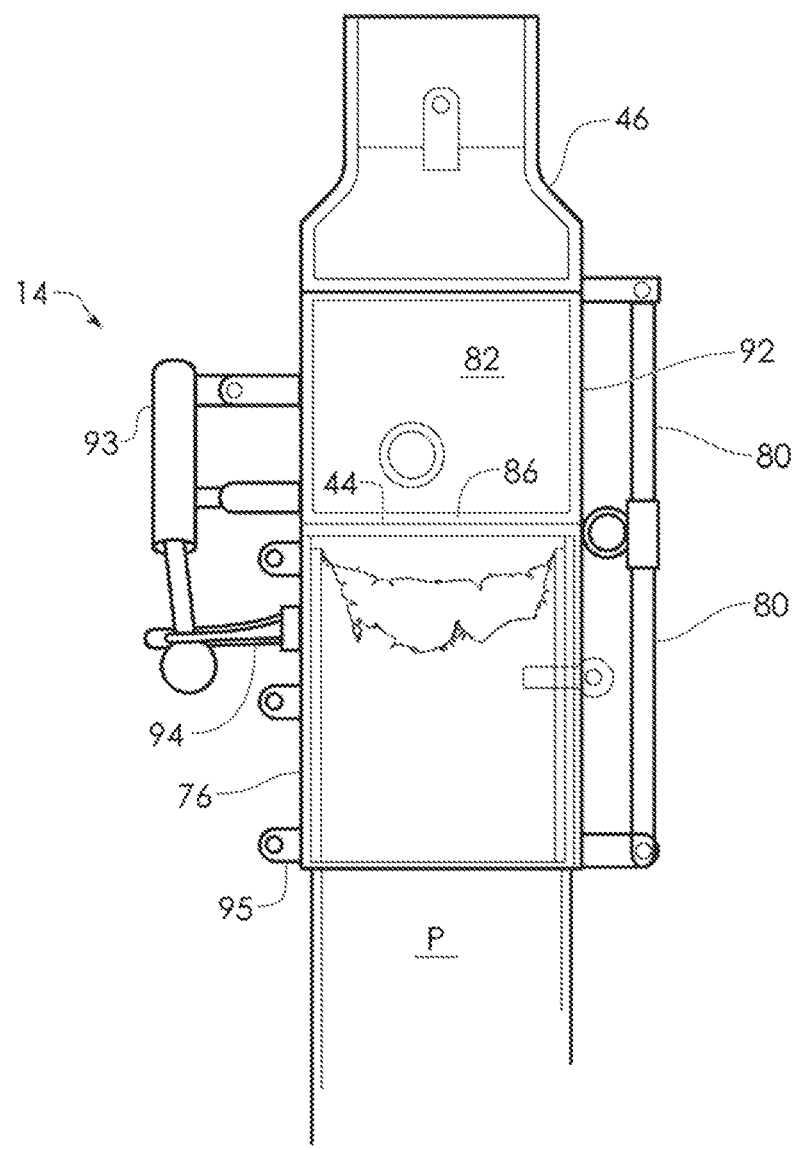
FIG. 7 shows a side view of the closed flange or collar (76) of FIG. 6 where upon a cap valve (12) would be seated by hydraulic forces forming a seal therebetween.
Figure 8:
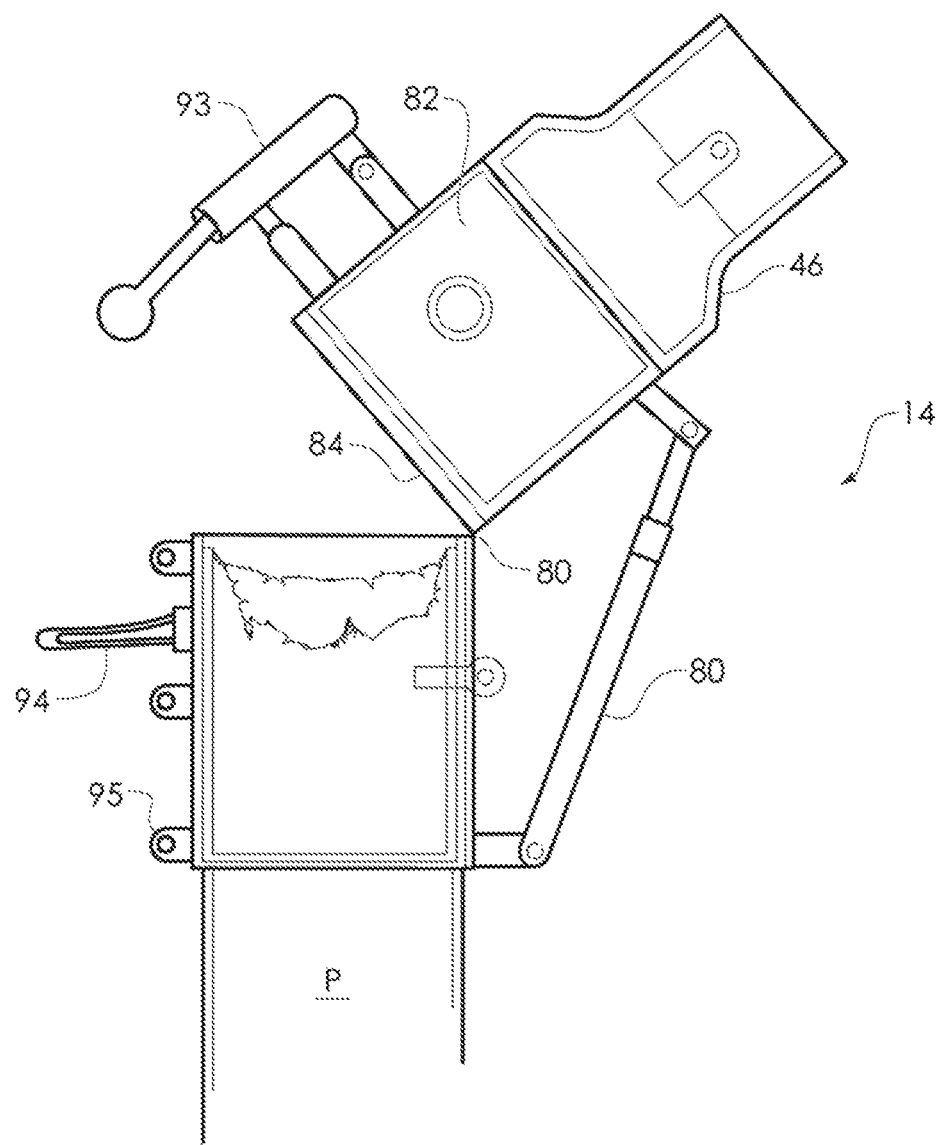
FIG. 8 shows a side view of FIG. 7 wherein the upper portion (82) is open, and can be rotated shut with the hydraulic ram (80) force shown available.
Figure 9:
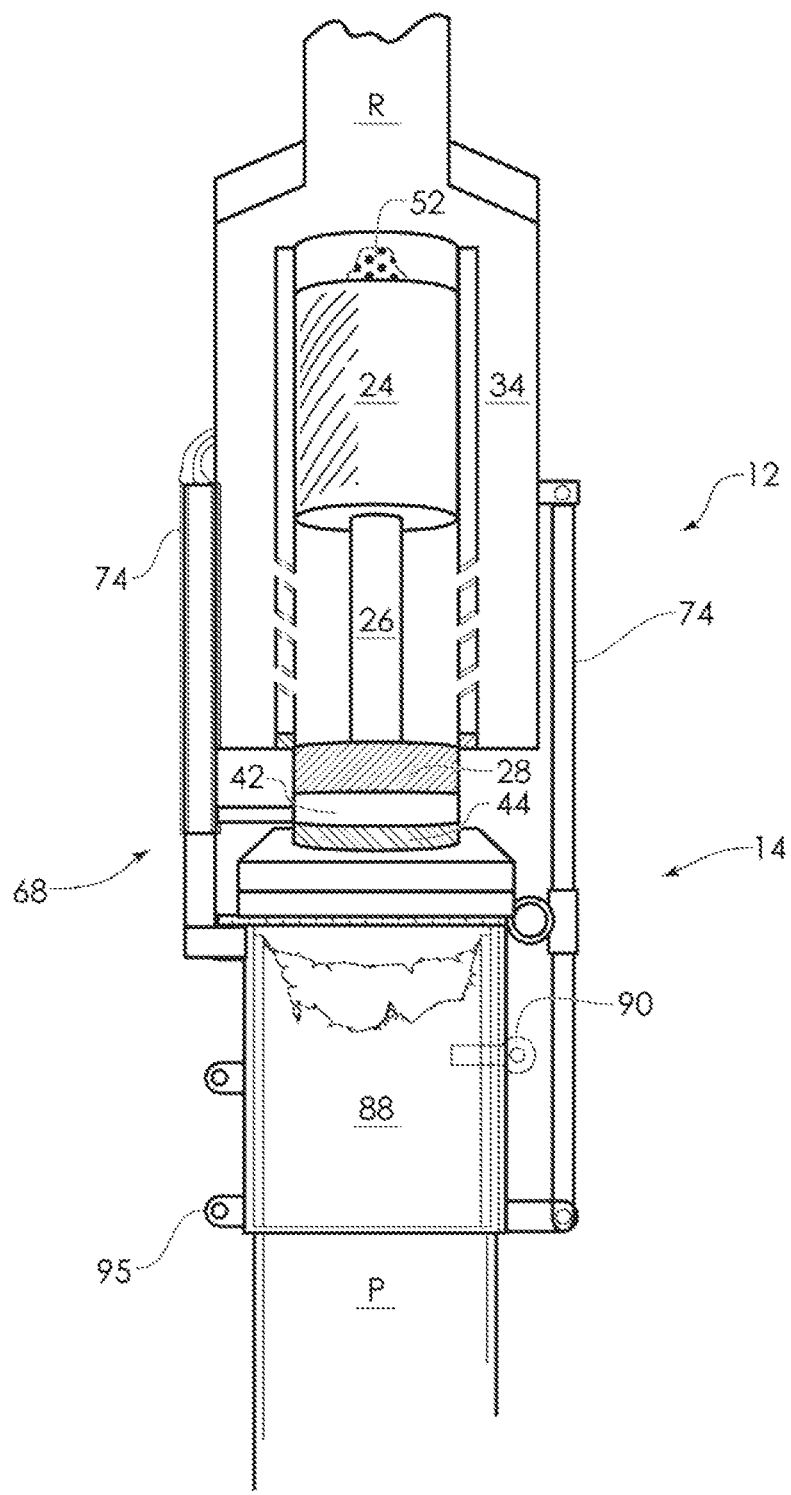
FIG. 9 shows a side view of FIG. 8 enlarged with the interior detail of the hydraulic ram (80) that can be shut, or can be partially or fully open to allow oil/gas to be transported through a riser pipe (R) for delivery to a s ship or reservoir for collection.

Various types of seals (38) may be formed between the connector (14) and the pipe (P). A flange seal (38) alone, or a flange seal (38) with gasket (40), are formed between the flange (F) and the connector (14), as shown in FIGS. 2, 3B, and 4, or between a collar clamp (76) and an intermittent pipe (18) or the like as discussed hereinafter. A valve seal holder (42) with an attachment seal lock (44) may be used, as shown in FIGS. 5 and 9. Furthermore, reduction casing (46) in an intermittent pipe (18) may be provided to step down or up the diameter to mate with a riser pipe (R), as shown in FIGS. 6, 7, and 8.

Optionally, a check valve (48) may be disposed in the hydraulic cylinder (24) to automatically release pressure, shown in FIG. 3A. Alternatively, an adjustable pressure release valve (50) may be disposed in the hydraulic cylinder (24), shown in FIG. 5. Also, a flow control valve (52) may be used to control the flow therethrough, as shown in FIG. 9.

For the most remote uses, a hydraulic fluid chamber (54), shown diagrammatically in FIG. 1, is used to provide hydraulic fluid to the connector (14), and other hydraulically actuated parts, may be provided in the cap valve (12). The hydraulic fluid chamber (54) provides hydraulic fluid to the primary hydraulic ram (26), and to the connector (14). Additionally, a controller (56), motor (60), pump (62) in fluid communication with the hydraulic fluid chamber (54), and battery pack (58) for powering and controlling the hydraulic fluid pressure to the connector (14) and to the hydraulic ram (26).

The connector (14) may have various hydraulically actuated clamps (20) used to attach the cap valve (12) to a pipe (P) with or without a flange (F). As shown in FIGS. 2 and 3A, a design of the hydraulically controlled connector's hydraulic clamp (20), where a flange (F) is available on the pipe (P), has at least two opposing horseshoe locks (64), typically four to six locks (64) where a flange (F) is available on the pipe (P), are pivotally attached about the periphery of the connector (14) and positioned via horizontal lockdown rams (66) that push outward on the horseshoe locks (64). The clamps (20) force the pipe flange (F) and the connector (14) to form a fast seal (38).

An alternative clamp (20), shown in FIG. 4, may have at least two opposing arms (68) ending in opposing L-shaped clamps (70) for latching on to a flange (F) disposed on the flow pipe (P) to forcefully form a seal (38) between the pipe (P) and the connector (14). Optionally, the at least two opposing arms (68) ending in opposing L-shaped clamps (70) for latching on to the flow pipe (P) may have hydraulically operable telescoping abilities, shown in FIG. 5. Horizontally disposed positioning rams (72) may also be provided which attach to the arms (68) ending in opposing L-shaped clamps (70) for latching on to a flange (F) disposed on the flow pipe (P) by providing lateral positioning. The horizontally disposed positioning rams (72) may be attached to an outer telescoping cylinder (74) of the telescoping arms (68), as shown in FIGS. 4 and 5.

Where the pipe (P) has simply been broken off, an open hinged collar (76), shown in FIGS. 6 through 9, which rotates closed upon the flow pipe (P) by actuation of a hydraulic arm (78). The collar (76) may be used as a flange (F), or the collar (76) may be joined by a hydraulically actuated hinge (80) to an upper body (82) to rotatably clamp tight upon the collar (84) providing a flange (86) therebetween. At least one cylindrical clamshell collar clamp (76) may be disposed vertically for encompassing the flow pipe (P). Such cylindrical clamshell collar clamps (76) have two half cylinders (88), and a horizontal hydraulic control ram (90) telescopically attached to each half cylinder (88) of the clamshell clamp (76) so that when the control ram (90) is fully extended the two half cylinders (88) form a tightly closed collar (76). Optionally, a cylindrical upper body valve outer casing (92) may be pivotably attached to the cylindrical clamshell clamp (76) so that the upper body (92) may be pivoted into position to provide a seal (44) with the closed clamshell clamps (76) forming a cylindrical structure that can hold onto the flow pipe (P). The remainder of the cap valve (12) is disposed on the upper body (92). A clamshell clamp lever (93), corresponding clamshell clamp latch (94), and clamshell clamp retainer(s) (95) may be provided to secure the collar (76) closed, as shown in FIGS. 6 through 9. FIG. 9 specifically demonstrates the present design without an intermittent pipe (18) as shown in FIG. 1, or an upper body (92) as shown in FIG. 7, which are optional.

It is to be understood that the present invention is not limited to the embodiments described above, but encompasses any and all embodiments within the scope of the following claims.

What is claimed is:

1. A cap valve (12) to shut off a runaway high pressure flow pipe (P), comprising:
   a hydraulic controlled connector (14)
   to attach a cylindrical valve chamber (16), or
   to attach to an intermittent pipe (18) connectable to a cylindrical valve chamber (16), to the flow pipe (P) in which the connector (14) has a hydraulic clamp (20) to grab the pipe (P), or to grab a flange (F) on the pipe (P), to hold the cap valve (12) in position; outlet ports (22) disposed in the cap valve (12), or in the intermittent pipe (18), above the hydraulic clamp (20) to permit high pressure flow to continue while the connector (14) is being installed on the pipe (P); and
   a valve hydraulic cylinder (24) encompassing a primary hydraulic ram (26) which has an adjustable flow primary seal (28) thereon disposed within the cylindrical valve chamber (16) to telescopically close or open access to the outlet ports (22) by moving the primary seal (28) into position to open or block fluid communication through the outlet ports (22).

2. The cap valve (12) of claim 1, wherein:
   a check valve (48) to automatically release pressure,
   an adjustable pressure release valve (50), or
   a flow control valve (52) is disposed in the hydraulic cylinder (24);
   the primary hydraulic ram (26) has a three way push-pull-hold functioning; or
   combinations thereof.

3. The cap valve (12) of claim 1, further comprising:
   a hydraulic fluid chamber (54) for providing hydraulic fluid to the primary hydraulic ram (26), the connector (14), or both.

4. The cap valve (12) of claim 3, further comprising:
   a controller (56), motor (60), pump (62) and battery pack (58) for controlling hydraulic fluid pressure to the connector (14), hydraulic ram (26), or both.

5. The cap valve (12) of claim 1, wherein:
   the hydraulically controlled connector's hydraulic clamp (20) comprises one of
   at least two opposing horseshoe locks (64) pivotably attached about the periphery of the connector (14) and are positioned via horizontal lockdown rams (66) that push outward on the horseshoe locks (64);
   at least two opposing arms (68) ending in opposing L-shaped clamps (70) for latching on to a flange (F) disposed on the flow pipe (P);
   at least two opposing hydraulically telescoping arms (68) ending in opposing L-shaped clamps (70) for latching on to the flow pipe (P);
   at least two opposing arms (68), having horizontally disposed positioning rams (72), the arms (68) ending in opposing L-shaped clamps (70) for latching on to a flange (F) disposed on the flow pipe (P);

at least two opposing hydraulically telescoping arms (68), having horizontally disposed positioning rams (72) attached to an outer telescoping cylinder (74) of the telescoping arms (68), ending in opposing L-shaped clamps (70) for latching on to the flow pipe (P);

at least one open hinged collar (76) to rotate closed upon the flow pipe (P) by actuation of a hydraulic arm (78) wherein the collar (76) is joined by a hydraulically actuated hinge (80) to an upper body (82) to rotatably clamp tight upon the collar (84) providing a flange (86) therebetween; or at least one cylindrical clamshell collar clamp (76) disposed vertically for encompassing the flow pipe (P) wherein the cylindrical clamshell collar clamp (76) has two half cylinders (88) which have a horizontal hydraulic control ram (90) telescopically attached to each half cylinder (88) of the clamshell clamp (76) so that when the control ram (90) is fully extended the two half cylinders form a closed collar (76), and a cylindrical upper body valve outer casing (92) pivotably attached to the cylindrical clamshell clamp (76) so that the upper body (92) may be pivoted into position to provide a seal (44) with the closed clamshell clamps (76) forming a cylindrical structure that can hold onto the flow pipe (P).

6. The cap valve (12) of claim 1, wherein:

the outlet ports (22) are insulated with heating elements (30);

the outlet ports (22) are double walled (32);

valve up flow tubes (34) in fluid communication with the outlet ports (22) to permit controlled flow about the cylindrical valve chamber (16) (into an attached riser pipe (R));

double walled (36) valve up flow tubes (34) in fluid communication with the outlet ports (22) to permit controlled flow about the cylindrical valve chamber (16);

valve up flow tubes (34), which are insulated with heating elements (30), in fluid communication with the outlet ports (22) to permit controlled flow about the cylindrical valve chamber (16); or combinations thereof.

7. The cap valve (12) of claim 1, further comprising:

a flange seal (38) disposed on the connector (14);

flange seal (38) with gasket (40) disposed on the connector (14);

a valve seal holder (42) to reinforce the seal (38) between the pipe (P) flange (F) and the connector (14);

an attachment seal lock (44);

reduction casing (46) attached to the connector (14) opposite the seal (38) to step down or up the diameter to mate with the intermittent pipe (18), a riser pipe (R), or the cylindrical valve chamber (16), or combinations thereof.

8. The cap valve (12) of claim 1, further comprising:

a hydraulic fluid chamber (54) for providing hydraulic fluid to the connector (14).

9. The cap valve (12) of claim 8, further comprising:

a controller (56), motor (60), pump (62), and battery pack (58) for powering and controlling the hydraulic fluid pressure to the connector (14).

10. A cap valve (12) to shut off a runaway high pressure flow pipe (P), comprising:

a hydraulic controlled connector (14) to attach a cylindrical valve chamber (16), or to attach to an intermittent pipe (18) connectable to a cylindrical valve chamber (16), to the flow pipe (P) in which the connector (14) has a hydraulic clamp (20) to grab the pipe (P), or to grab a flange (F) on the pipe (P), to hold the cap valve (12) in position; and a valve hydraulic cylinder (24) encompassing a primary hydraulic ram (26) which has an adjustable flow primary seal (28) thereon disposed within the cylindrical valve chamber (16) to telescopically close or open to outlet ports (22) by moving the primary seal (28) into position to open or block fluid communication through the outlet ports (22).

11. The cap valve (12) of claim 10, wherein:

the outlet ports (22) are insulated with heating elements (30);

the outlet ports (22) are double walled (32);

valve up flow tubes (34) in fluid communication with the outlet ports (22) to permit controlled flow about the cylindrical valve chamber (16) (into an attached riser pipe (R));

double walled (36) valve up flow tubes (34) in fluid communication with the outlet ports (22) to permit controlled flow about the cylindrical valve chamber (16);

valve up flow tubes (34), which are insulated with heating elements (30), in fluid communication with the outlet ports (22) to permit controlled flow about the cylindrical valve chamber (16); or combinations thereof.

12. The cap valve (12) of claim 10, further comprising:

a flange seal (38) disposed on the connector (14);

flange seal (38) with gasket (40) disposed on the connector (14);

a valve seal holder (42) to reinforce the seal (38) between the pipe (P) flange (F) and the connector (14);

an attachment seal lock (44);

reduction casing (46) attached to the connector (14) opposite the seal (38) to step down or up the diameter to mate with the intermittent pipe (18), a riser pipe (R), or the cylindrical valve chamber (16), or combinations thereof.

13. The cap valve (12) of claim 10, further comprising:

a hydraulic fluid chamber (54) for providing hydraulic fluid to the connector (14).

14. The cap valve (12) of claim 13, further comprising:

a controller (56), motor (60), pump (62), and battery pack (58) for powering and controlling the hydraulic fluid pressure to the connector (14).

15. The cap valve (12) of claim 10, wherein:

a check valve (48) to automatically release pressure;

an adjustable pressure release valve (50), or a flow control valve (52) is disposed in the hydraulic cylinder (24);

the primary hydraulic ram (26) has a three way push-pull-hold functioning; or combinations thereof.

16. The cap valve (12) of claim 10, further comprising:

a hydraulic fluid chamber (54) for providing hydraulic fluid to the primary hydraulic ram (26), the connector (14), or both.

17. The cap valve (12) of claim 16, further comprising:

a controller (56), motor (60), pump (62) and battery pack (58) for controlling hydraulic fluid pressure to the connector (14), hydraulic ram (26), or both.

18. The cap valve (12) of claim 10, wherein:

the hydraulically controlled connector's hydraulic clamp (20) comprises one of at least two opposing horseshoe locks (64) pivotably attached about the periphery of the connector (14) and are positioned via horizontal lockdown rams (66) that push outward on the horseshoe locks (64);

at least two opposing arms (68) ending in opposing L-shaped clamps (70) for latching on to a flange (F) disposed on the flow pipe (P);

at least two opposing hydraulically telescoping arms (68) ending in opposing L-shaped clamps (70) for latching on to the flow pipe (P);

at least two opposing arms (68), having horizontally disposed positioning rams (72), the arms (68) ending in opposing L-shaped clamps (70) for latching on to a flange (F) disposed on the flow pipe (P);

at least two opposing hydraulically telescoping arms (68), having horizontally disposed positioning rams (72) attached to an outer telescoping cylinder (74) of the telescoping arms (68), ending in opposing L-shaped clamps (70) for latching on to the flow pipe (P);

at least one open hinged collar (76) to rotate closed upon the flow pipe (P) by actuation of a hydraulic arm (78) wherein the collar (76) is joined by a hydraulically actuated hinge (80) to an upper body (82) to rotatably clamp tight upon the collar (84) providing a flange (86) therebetween; or at least one cylindrical clamshell collar clamp (76) disposed vertically for encompassing the flow pipe (P) wherein the cylindrical clamshell collar clamp (76) has two half cylinders (88) which have a horizontal hydraulic control ram (90) telescopically attached to each half cylinder (88) of the clamshell clamp (76) so that when the control ram (90) is fully extended the two half cylinders form a closed collar (76), and a cylindrical upper body valve outer casing (92) pivotably attached to the cylindrical clamshell clamp (76) so that the upper body (92) may be pivoted into position to provide a seal (44) with the closed clamshell clamps (76) forming a cylindrical structure that can hold onto the flow pipe (P).

* * * * *